US010489171B2

(12) United States Patent
Shein et al.

(10) Patent No.: US 10,489,171 B2
(45) Date of Patent: Nov. 26, 2019

(54) GENERATING CONTENT ITEMS FOR PRESENTATION TO ONLINE SYSTEM USERS FROM CONTENT INCLUDED ON A PAGE MAINTAINED BY THE ONLINE SYSTEM

(71) Applicant: Facebook, Inc., Menlo Park, CA (US)

(72) Inventors: David Shein, San Francisco, CA (US); Andy Lien, Foster City, CA (US); Camelia Dobrin, Mountain View, CA (US); David Thomsen, San Mateo, CA (US); Pelle Elander Wisten, Brooklyn, NY (US); Alexander William Watts, San Francisco, CA (US); Yujing Zhang, Fremont, CA (US); Xiaoyu Guang, Mountain View, CA (US); Ryan Joseph Moniz, Mountain View, CA (US); Katherine Nicole Geiger, San Jose, CA (US); Meridith Major Blascovich, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 158 days.

(21) Appl. No.: 15/394,727

(22) Filed: Dec. 29, 2016

(65) Prior Publication Data

US 2018/0189071 A1    Jul. 5, 2018

(51) Int. Cl.
*G06F 9/44*    (2018.01)
*G06F 3/0482*    (2013.01)
*H04L 29/08*    (2006.01)
*G06F 9/451*    (2018.01)

(52) U.S. Cl.
CPC .............. *G06F 9/451* (2018.02); *H04L 67/20* (2013.01); *H04L 67/306* (2013.01)

(58) Field of Classification Search
CPC ....... G06F 9/451; G06F 3/0482; H04L 67/20; H04L 67/306
See application file for complete search history.

(56) References Cited

U.S. PATENT DOCUMENTS

| 2013/0124308 | A1* | 5/2013 | Hegeman | ............... | G06Q 10/04 |
| | | | | | 705/14.48 |
| 2013/0218962 | A9* | 8/2013 | Schoen | .................. | G06Q 10/10 |
| | | | | | 709/204 |
| 2015/0051981 | A1* | 2/2015 | Ge | ..................... | G06Q 30/0269 |
| | | | | | 705/14.66 |

(Continued)

*Primary Examiner* — Ryan F Pitaro
*Assistant Examiner* — Parmanand D Patel
(74) *Attorney, Agent, or Firm* — Fenwick & West LLP

(57) ABSTRACT

An online system maintains a page of content for a user that includes content provided to the online system by the user. To allow the user to more easily present content items to other online system users, the online system receives an objective specifying a desired interaction by users presented with the content item from the user and generates a set of content items from content included on the page. One or more content items of the set are selected and a budget for presenting the selected one or more content items is received, and the online system includes one or more of the selected content items in selection processes along with bid amounts based on the budget that select content for presentation to other users. The online system may update the selected content items of the set over time as content included on the page is modified.

23 Claims, 3 Drawing Sheets

(56) References Cited

U.S. PATENT DOCUMENTS

2015/0332310 A1* 11/2015 Cui .................... G06Q 30/0244
  705/14.45
2015/0379555 A1* 12/2015 Dua .................. G06Q 30/0242
  705/14.41

* cited by examiner

GENERATING CONTENT ITEMS FOR PRESENTATION TO ONLINE SYSTEM USERS FROM CONTENT INCLUDED ON A PAGE MAINTAINED BY THE ONLINE SYSTEM

BACKGROUND

This disclosure relates generally to disclosure relates generally to presenting content to users of an online system, and more specifically to leveraging content previously provided to the online system by a user to generate content items for presentation to other users.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow publishing users (e.g., businesses) to sponsor presentation of content on an online system to gain public attention for a user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the publishing user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

Conventional online systems rely on a publishing user to create content items for presentation to other online system users. While this allows the publishing user to customize content items that are presented by an online system, creative multiple content items for presentation by the online system may consume time and resources of the publishing user. For publishing users with limited resources, it is often impractical to create a large number of content items for distribution by the online system, limiting effectiveness of distribution of the content items to other users via the online system. However, many online systems maintain a page of content for a publishing user, where content provided to the online system by the publishing user may be accessed by other online system users accessing the page. While this allows the publishing user to easily provide content to the online system, distribution of content included on a page maintained by the online system is limited to other users who access the page of content rather than active dissemination of the content by the online system to other users.

SUMMARY

An online system maintains a page of content for a user that includes content provided by the user to the online system. The user provides content to the online system, which presents the provided content to other users via the page. Hence, by accessing the page maintained by the online system, other online system users may access the content provided to the online system by the user. For example, the user is a business that provides images and descriptions of products offered by the business to the page maintained by the user, allowing other online system users to access the images and descriptions of products by accessing the page. Any suitable type of content may be included on the page and presented to users accessing the page. Example types of content include: video data, image data, text data, audio data, or any other suitable type of data.

While the page allows other online system users to view or interact with content provided by the user, access to content maintained by the page is limited to those users who access the page. This limits distribution of content provided to the online system by the user to other online system users. Although the online system may notify other users when the user provides content to the page, such notifications may be sent to users who have previously accessed the page or who have established a connection with the page via the online system, which limits a number of online system users accessing or interacting with the content provide to the page. To inform a greater number of users of the page maintained for the user by the online system, which may increase online system user interaction with the page or with other content associated with the page, the online system presents content items associated with the page to other users in exchange for compensation from the user. To simplify presentation of content items in exchange for compensation, the online system determines content items for presentation in exchange for compensation form the user based on content included on the page maintained for the user.

To determine content items for presentation to other users in exchange for compensation from the user, the online system receives an objective for presentation of one or more content items from the user. The objective identifies an interaction that the user for whom the page is maintained by the online system desires additional users to perform when presented with the content item. Example objectives include: establishing a connection with the page, performing a specific interaction with the page, performing a specific interaction with content included on the page, installing an application associated with a content item, indicating a preference for a content item, sharing a content item with other users. In various embodiments, the online system receives different objectives for presentation of different content items. Alternatively, the online system receives a common objective for presentation of multiple content items.

Based on the received objective and content included on the page maintained for the user, the online system generates a set of content items. Each content item of the set includes content provided to the page by the user and additional content, with the additional content determined from the received objective. For example, the online system maintains different phrases or images associated with different objectives, and generates a content item including content provided to the page and a phrase or an image associated with the received objective. As an example, the online system associates a prompt for an additional user to establish a connection with the page and a link for establishing a connection with the page with an objective to establish a connection with the page; if the received objective is to establish a connection with the page, the online system generates one or more content items including the prompt and link associated with the objective to establish the connection with the page, as well as content included on the page. The online system may retrieve any suitable content included on the page and generate content items of the set of content items based on the retrieved content. Hence, rather than have the user specify content items for presentation by the online system, the online system leverages content previously provided to the online system to allow the user to more easily distribute content items via the online system.

When generating the set of content items from the content included on the page, the online system accounts for prior interactions by users with content included on the page to increase likelihoods of additional users interacting with the generated content items. In various embodiments, the online system determines amounts of interactions by users with content included on the page and selects content having at least a threshold amount of interaction for inclusion in generated content items. Alternatively, the online system determines amounts of interaction by users with content included on the page, ranks content included in the page based on the determined amounts of interaction, and selects content having at least a threshold position in the ranking for inclusion in generated content items. When determining amounts of interaction with content included in the page, the online system may determine numbers of occurrences of one or more specific types of interactions or may determine number of occurrences of various types of interactions. Example types of interaction with content included on the page include: indicating a preference for the content (i.e., "liking" the content), sharing the content with one or more other users, providing a comment on the content, and indicating a reaction to the content.

The online system selects one or more of the set of content items. In some embodiments, the online system presents the set of content items to the user, and receives selections of one or more content items form the user. Alternatively, the online system selects one or more of the set of content items without receiving interaction from the user. For example, the online system applies one or more models determining a likelihood of additional users performing one or more interactions when presented with a content item to each of the set of content items. Based on the determined likelihoods, the online system selects one or more of the content items. For example, the online system selects content items of the set with which additional users have at least a threshold likelihood of performing the one or more interactions. As another example, the online system ranks content items of the set based on the likelihoods of the user performing the one or more interactions with the content items and selects content items having at least a threshold position in the ranking. The online system may apply different models to content items of the set based on the objective received from the user.

The online system modifies the set of content items as the user modifies content included on the page or includes additional content on the page. For example, as the online system receives additional content from the user for inclusion on the page, the online system, the online system modifies the set of content items based on the additional content and selects one or more content items of the modified set. As an example, the online system generates alternative content items based on additional content included on the page and modifies the set of content items to include the alternative content items in addition to the previously generated content items, selects content items of the modified set of content items. In various embodiments, the online system modifies the set of content items in response to receiving at least a threshold amount of additional content from the user for inclusion on the page. For example, in response to the user providing at least the threshold amount of additional content to the online system for inclusion on the page within a threshold amount of time, the online system modifies the set of content items to include alternative content items generated from the additional content and selects content items of the modified set of content items.

Additionally, the online system receives a budget for presentation of the selected one or more content items to the additional users from the user. The budget specifies a total amount of compensation provided by the user to the online system for presentation of the selected one or more content items the additional users. Hence, the online system presents the selected content items to additional users until the online system receives an amount of compensation equaling the budget from the user.

When the online system identifies an opportunity to present content to an additional user, the online system determines a bid amount for presenting a selected content item to the additional user via the identified opportunity. In various embodiments, the online system identifies a selected content item based on prior interactions by the additional user with content presented by the online system. For example, the online system identifies a selected content item that includes content having at least a threshold amount of characteristics matching characteristics of content presented to the additional user with which the additional user previously interacted.

The online system includes the content item and the determined bid amount in one or more selection processes that select content for presentation to the additional user. The one or more selection processes select content items for presentation to the additional user based on likelihoods of the additional user performing one or more interactions with various content items and bid amounts associated with various content items. In various embodiments, the online system determines an expected value for the selected content item based on the determined bid amount and a likelihood of the additional user performing one or more interactions with the selected content item and determines expected values for other content items based on likelihoods of the additional user performing one or more interactions with each of the other content items and bid amounts associated with each of the other content items. The one or more selection processes may rank the additional content items and the other content items based on their expected values and select content having at least a threshold position in the ranking for presentation to the additional user. Alternatively, the one or more selection processes select content having at least a threshold expected value for presentation to the additional user.

In some embodiments, the online system determines of the bid amount for the selected content item and includes the selected content item in one or more selection processes in response to the additional user for whom the opportunity to present content was identified being included in a target audience for the selected content items. To increase a likelihood of additional users presented with a content item of the set of content items, the online system determines a target audience of additional users based on the page maintained for the user and initially includes content items selected from the set of content items in selection processes for identified opportunities to present content to additional users of the target audience. Identifying the target audience based on the page allows the online system to present the generated content items to users who are more likely to have an interest in the page, making additional users of the target audience more likely to interact with the generated content items when presented.

The online system may determine the target audience of additional users based on users who previously performed one or more specific interactions with the page maintained for the user. For example, the online system 140 identifies users who indicated a preference for the page within a threshold amount of time from a time when the one or more content items were selected and determines the target audience as additional users having at least a threshold measure of similarity to the identified users. The online system may additionally or alternatively determine the target audience as additional users having at least a threshold amount (e.g., a threshold number, a threshold percentage) of interests included in user profiles corresponding to the additional users matching an interest associated with the page maintained for the user. The user for whom the page is maintained may identify one or more interests associated with content provided to the page, and the online system maintains the interests in association with the page. Determining the target audience as additional users having the threshold amount of interests matching interests associated with the page increases a likelihood of content items selected from the set of content items being relevant to the additional users, which increases a likelihood of additional users of the target audience interacting with a content item selected from the set of content items. In some embodiments, the online system determines the target audience as additional users having the threshold amount of interests matching interests associated with the page and other users having at least a threshold measure of similarity to the additional users having at least the threshold amount of interests matching the interests associated with the page.

In response to the one or more selection processes selecting the selected content item of the set of content items, the online system communicates the selected content item of the set of content items to a client device associated with the additional user for presentation to the additional user. The online system subsequently reduces the budget for presenting the selected content items to users by an amount based on the bid amount determined for the selected content item when the selected content item is selected by the one or more selection processes. In some embodiments, the online system decreases the budget by the amount in response to receiving an indication that the additional user performed an action corresponding to the received objective. The amount by which the budget is decreased may be based on the bid amounts associated with other content items included in the one or more selection processes in various embodiments.

If the online system determined a target audience for presentation of content items of the set of content items, as selected content items from the set of content items are presented to additional users, the online system modifies the target audience in some embodiments. Based on characteristics of additional users presented with a content item of the set of content items, the online system modifies the target audience to include other users having at least a threshold measure of similarity to the additional users presented with a selected content items of the set of content items who interacted with the selected content item of the set of content items or who performed an action corresponding to the received objective after being presented with the selected content item of the set of content items. Modifying the target audience based on actions performed by additional users who were presented with content items of the set of content items allows the online system to increase likelihoods that content items of the set of content items are presented to additional users who are likely to perform the action corresponding to the received objective.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
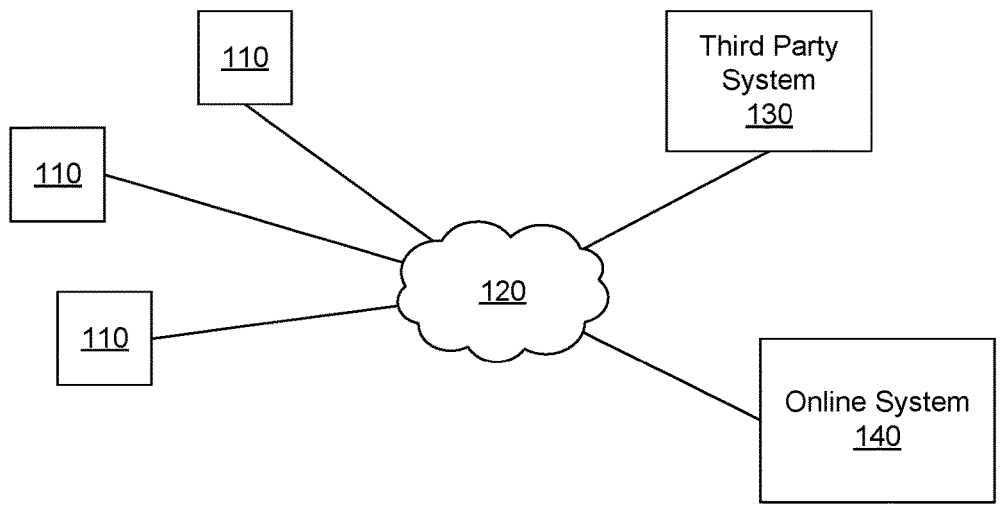
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
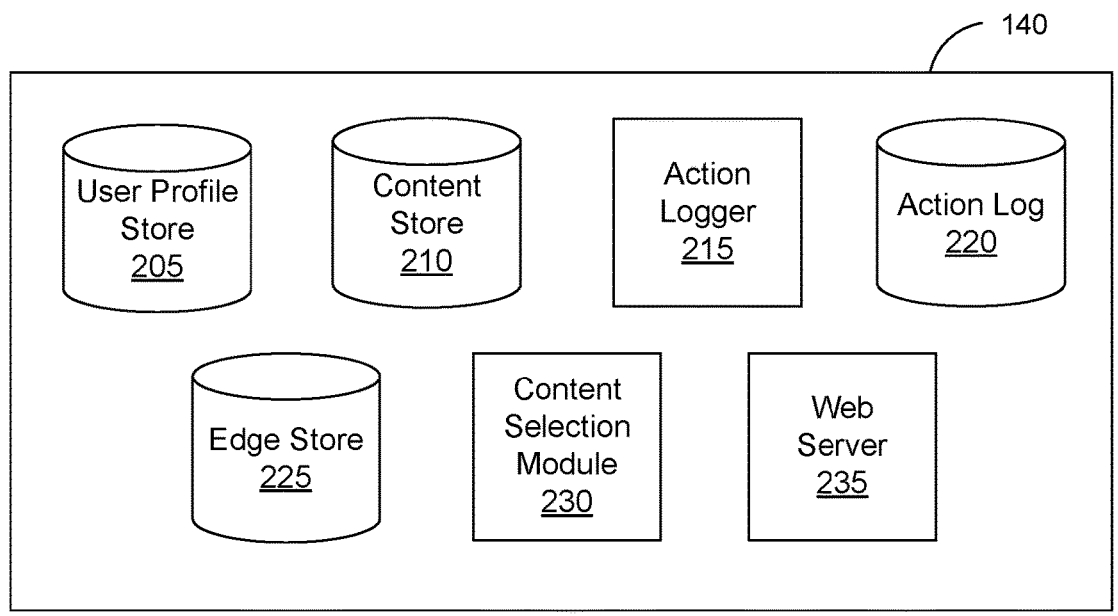
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture. For example, the online system 140 is a social networking system, a content sharing network, or another system providing content to users.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The content selection module 230 may simplify generation of content items for a user of the online system 140 for presentation by leveraging content included on a page for the user maintained in the content store 210. As further described below in conjunction with FIGS. 3 and 4, the content selection module 230 receives an objective for presenting content items based on the maintained page and generates a set of content items from content included on the page based on the objective. The objective specifies a desired action by additional users of the online system 140 when presented with a content item of the set of content items. As further described below in conjunction with FIG. 3, the content selection module 230 selects content from the page based on prior interactions by users with the content on the page and generates the set of content based on the selected content and the received objective. For example, the content selection module 230 ranks different content included on the page based on amounts of user interaction with the different content, selects content having at least a threshold position in the ranking, and generates the set of content item from the selected content. In various embodiments, if the user modifies content included on the page, the content selection module 230 modifies the set of content items, as further described below in conjunction with FIG. 3.

The content selection module 230 selects one or more content items of the set based on input from the user for whom the page is maintained or based on predicted likelihoods of interaction by additional users with content items of the set. Additionally, the content selection module 230 receives a budget from the user for whom the page is maintained that specifies a maximum amount of compensation the online system 140 will receive from the user for whom the page is maintained in exchange for presentation of the selected content items of the set to additional users. When the content selection module 230 identifies an opportunity to present content to an additional user, the content selection module 230 determines bid amounts for one or more of the selected content items of the set based on the received budget and prior presentations of other selected content items of the set of content items to users and includes one or more of the selected content items and their corresponding bid amounts in one or more selection processes that select content for presentation to the additional user via the opportunity. Hence, the content selection module 230 may leverage content previously provided to the online system 140 by the user to generate content items that are presented to additional users, increasing awareness of content associated with the user for whom the page is maintained by other online system users.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 2Y may provide application programming interface (API) functionality to send data directly to native client device operating systems, such as IOS®, ANDROID™, or BlackberryOS.

Figure 3:
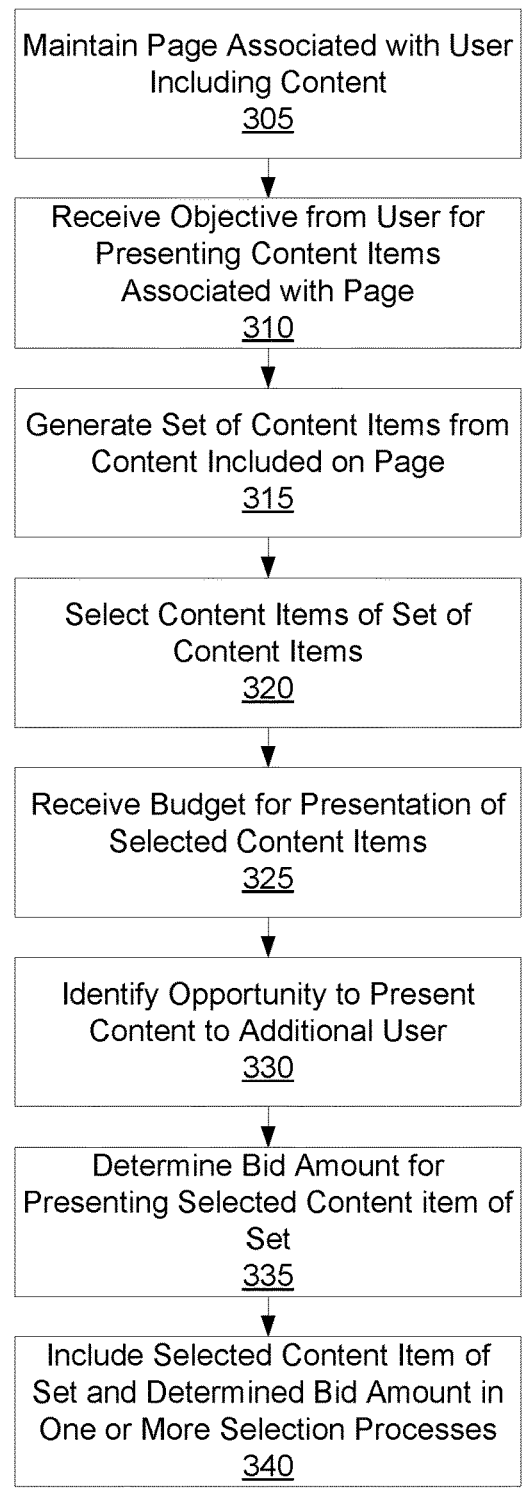
FIG. 3 is a flowchart of a method for generating content items for presentation to various users based on content provided to a page of content maintained by an online system, in accordance with an embodiment.

Generating Content Items for Presentation to Users Based on Content Included on a Page Maintained by the Online System FIG. 3 is a flowchart of one embodiment of a method for an online system 140 generating content items for presentation to various users based on content provided to a page of content maintained by the online system 140 for a user. In various embodiments, the method may include different or additional steps than those described in conjunction with FIG. 3. Additionally, in some embodiments, the method may perform steps in different orders than the order described in conjunction with FIG. 3.

The online system 140 maintains 305 a page of content for a user that includes content provided by the user to the online system 140. For example, the page is associated with a user profile of the user maintained by the online system 140 and includes content items provided to the online system 140 by the user. Other users may access the content items provided to the online system 140 by the user by accessing the page maintained for the user. For example, the user is a business that provides images and descriptions of products offered by the business to the page maintained by the user, allowing other online system users to access the images and descriptions of products by accessing the page. The user may provide any suitable type of content to the online system 140 for inclusion on the page in various embodiments. Example types of content include: video data, image data, text data, audio data, or any other suitable type of data. In various embodiments, the page presents content provided by the user in an order specified by the user. Alternatively, the page presents content provided by the user in an order in which the online system 140 received content from the user; for example, content more recently received by the online system 140 from the user is presented in more visible locations of the page than content that was less recently received by the online system 140 from the user.

While the page of content maintained 305 by the online system 140 allows other users to view or interact with content provided by the user, maintaining 305 the page of content may limit a number of users to whom content provided to the page is presented. For example, users who do not access the page are not presented with content that the user provided to the page. As another example, users who are unaware that the page is maintained 305 by the online system 140 are unlikely to access the page and view or interact with content provided by the user to the page. In various embodiments, the online system 140 may notify other users when the user provides content to the page, which may prompt the other users to access the page; however, the online system 140 may notify a limited number of users or notify users satisfying certain criteria (e.g., users who established a connection with the page, users who previously interacted with the page) of content provided to the page by the user.

To inform a greater number of users of the page maintained 305 by the online system 140 for the user, which may increase a number of users who access the page and view or interact with content provided by the page, the online system 140 presents content items associated with the page to other users in exchange for compensation from the user. Hence, the user sponsors presentation of content items by the online system 140 to other users to increase exposure of content provided to, or otherwise associated with, the page. To simplify presentation of content items in exchange for compensation, the online system 140 determines content items for presentation in exchange for compensation form the user based on content included on the page maintained 305 for the user.

To determine content items for presentation to other users in exchange for compensation from the user, the online system 140 receives 310 an objective for presentation of one or more content items from the user. As further described above in conjunction with FIG. 2, the objective identifying an interaction that the user for whom the page is maintained 305 by the online system 140 desires additional users to perform when presented with the content item. Example objectives include: establishing a connection with the page, performing a specific interaction with the page, performing a specific interaction with content included on the page, installing an application associated with a content item, indicating a preference for a content item, sharing a content item with other users. In various embodiments, the online system 140 receives 310 different objectives for presentation of different content items. Alternatively, the online system 140 receives 310 a common objective for presentation of multiple content items.

Based on the received objective and content included on the page maintained 305 for the user, the online system 140 generates 315 a set of content items. Each content item of the set includes content provided to the page by the user and additional content, with the additional content determined from the received objective. For example, the online system 140 maintains different phrases or images associated with different objectives, and generates 315 a content item including content provided to the page and a phrase or an image associated with the received objective. As an example, the online system 140 associates a prompt for an additional user to establish a connection with the page and a link for establishing the connection with the page with an objective to establish a connection with the page; if the received objective is to establish a connection with the page, the online system 140 generates one or more content items including the prompt and link associated with the objective to establish the connection with the page, as well as content included on the page. The online system 140 may retrieve any suitable content included on the page and generate 315 content items of the set of content items based on the retrieved content. For example, the online system 140 may retrieve images, video, audio, or text included on the page using any suitable technique. This allows the online system 140 to leverage content previously provided to the online system 140 by the user to generate 315 the set of content items rather than request the user manually configure or provide various content items for presentation by the online system 140 in exchange for compensation.

In some embodiments, the online system 140 retrieves additional content associated with the user for whom the page is maintained 305 from one or more third party systems 130 or retrieves additional content associated with the page from one or more third party systems 130 and generates 315 one or more content items of the set based on the content maintained by the one or more third party systems 130. For example, the online system 140 includes information associated with the page that identifies one or more third party systems 130 associated with the page and authentication information for accessing the one or more third party systems 130. Using the authentication information, the online system 140 accesses one or more of the third party system 130 and retrieves content from the one or more third party systems 130 for generating 315 the set of content items. In some embodiments, the user for whom the online system 140 maintains 305 the page specifies third party systems 130 from which the online system 140 is authorized to retrieve content for generating 315 content items or specifies content maintained by one or more third party systems 130 that the online system 140 is authorized to retrieve for generating 315 content items.

The online system 140 accounts for prior interactions by users with content included on the page when generating 315 the set of content item to increase likelihoods of additional users interacting with the generated content items. In various embodiments, the online system 140 determines amounts of interactions by users with content included on the page and selects content having at least a threshold amount of interaction for inclusion in generated content items. Alternatively, the online system 140 determines amounts of interaction by users with content included on the page, ranks the content included in the page based on the determined amounts of interaction, and selects content having at least a threshold position in the ranking for inclusion in generated content items. When determining amounts of interaction with content included in the page, the online system 140 may determine numbers of occurrences of one or more specific types of interactions or may determine number of occurrences of various types of interactions. Example types of interaction with content included on the page include: indicating a preference for the content (i.e., "liking" the content), sharing the content with one or more other users, providing a comment on the content, and indicating a reaction to the content. The user may identify the specific types of interactions to the online system 140, or the online system 140 may determine the specific types of interactions based on prior presentation of content items to online system users.

The online system 140 selects 320 one or more of the set of content items. In some embodiments, the online system 140 presents the set of content items to the user, and receives selections of one or more content items form the user. Alternatively, the online system 140 selects 320 one or more of the set of content items without receiving interaction from the user. For example, the online system 140 applies one or more models determining a likelihood of additional users performing one or more interactions when presented with a content item to each of the set of content items. Based on the determined likelihoods, the online system 140 selects 320 one or more of the content items. For example, the online system 140 selects 320 content items of the set with which additional users have at least a threshold likelihood of performing the one or more interactions. As another example, the online system 140 ranks content items of the set based on the likelihoods of the user performing the one or more interactions with the content items and selects 320 content items having at least a threshold position in the ranking. The online system 140 may apply different models to content items of the set based on the objective received 310 from the user. For example, the online system 140 applies one or more models to the content items that determine likelihoods of users performing interactions corresponding to the received objective.

The online system 140 modifies the set of content items as the user modifies content included on the page or includes additional content on the page. For example, as the online system 140 receives additional content from the user for inclusion on the page, the online system 140, the online system 140 modifies the set of content items based on the additional content and selects 320 one or more content items of the modified set. As an example, the online system 140 generates alternative content items based on additional content included on the page and modifies the set of content items to include the alternative content items in addition to the previously generated content items, selects 320 content items of the modified set of content items. In various embodiments, the online system 140 modifies the set of content items in response to receiving at least a threshold amount of additional content from the user for inclusion on the page. For example, in response to the user providing at least the threshold amount of additional content to the online system 140 for inclusion on the page within a threshold amount of time, the online system 140 modifies the set of content items to include alternative content items generated 315 from the additional content and selects 320 content items of the modified set of content items.

Additionally, the online system 140 receives 325 a budget for presentation of the selected one or more content items to the additional users from the user. The budget specifies a total amount of compensation provided by the user to the online system 140 for presentation of the selected one or more content items the additional users. Hence, the online system 140 presents the selected content items to additional users until the online system 140 receives an amount of compensation equaling the budget from the user. In some embodiments, the online system 140 receives targeting criteria for presenting the selected one or more content items from the user in addition to the budget. The targeting criteria specify characteristics of additional users who are eligible to be presented with the selected one or more content items; hence, additional users having characteristics satisfying at least a threshold amount of the targeting criteria are eligible to be presented with the selected one or more content items, while additional users having characteristics satisfying less than the threshold amount of the targeting criteria are not eligible to be presented with the selected one or more content items. The user may specify different targeting criteria for different selected content items to present different selected content items to users having different characteristics, or the user may specify common targeting criteria for multiple selected content items.

When the online system 140 identifies 330 an opportunity to present content to an additional user, the online system 140 determines 335 a bid amount for presenting a selected content item to the additional user via the identified opportunity. In various embodiments, the online system 140 identifies a selected content item based on prior interactions by the additional user with content presented by the online system 140. For example, the online system 140 identifies a selected content item that includes content having at least a threshold amount of characteristics matching characteristics of content presented to the additional user with which the additional user previously interacted. Examples of determining 335 a bid amount from a budget and prior presentations of one or more content items are further described in U.S. patent application Ser. No. 13/294,094, filed on Nov. 10, 2011, which is hereby incorporated by reference in its entirety.

The online system 140 includes 340 the content item and the determined bid amount in one or more selection processes that select content for presentation to the additional user. As further described above in conjunction with FIG. 2, the one or more selection processes select content items for presentation to the additional user based on likelihoods of the additional user performing one or more interactions with various content items and bid amounts associated with various content items. In various embodiments, the online system 140 determines an expected value for the selected content item based on the determined bid amount and a likelihood of the additional user performing one or more interactions with the selected content item and determines expected values for other content items based on likelihoods of the additional user performing one or more interactions with each of the other content items and bid amounts associated with each of the other content items. The one or more selection processes may rank the additional content items and the other content items based on their expected values and select content having at least a threshold position in the ranking for presentation to the additional user. Alternatively, the one or more selection processes select content having at least a threshold expected value for presentation to the additional user.

In some embodiments, the online system 140 determines 335 of the bid amount for the selected content item and includes 340 the selected content item in one or more selection processes in response to the additional user for whom the opportunity to present content was identified 330 being included in a target audience for the selected content items. To increase a likelihood of additional users presented with a content item of the set of content items, the online system 140 determines a target audience of additional users based on the page maintained 305 for the user and initially includes 340 content items selected 320 from the set of content items in selection processes for identified opportunities to present content to additional users of the target audience. Identifying the target audience based on the page allows the online system 140 to present the generated content items to users who are more likely to have an interest in the page, making additional users of the target audience more likely to interact with the generated content items when presented.

The online system 140 may determine the target audience of additional users based on users who previously performed one or more specific interactions with the page maintained 305 for the user. For example, the online system 140 identifies users who indicated a preference for the page within a threshold amount of time from a time when the one or more content items were selected 320 and determines the target audience as additional users having at least a threshold measure of similarity to the identified users. Examples of determining measures of similarity between users who performed one or more specific interactions with the page and other users are further described in U.S. patent application Ser. No. 13/297,117, filed on Nov. 15, 2011, U.S. patent application Ser. No. 14/290,355, filed on May 29, 2014, and U.S. patent application Ser. No. 15/068,526, filed on Mar. 11, 2016, each of which is incorporated by reference in its entirety. The online system 140 may additionally or alternatively determine the target audience as additional users having at least a threshold amount (e.g., a threshold number, a threshold percentage) of interests included in user profiles corresponding to the additional users matching an interest associated with the page maintained 305 for the user. The user for whom the page is maintained 305 may identify one or more interests associated with content provided to the page, and the online system 140 maintains the interests in association with the page. Determining the target audience as additional users having the threshold amount of interests matching interests associated with the page increases a likelihood of content items selected 320 from the set of content items being relevant to the additional users, which increases a likelihood of additional users of the target audience interacting with a content item selected 320 from the set of content items. In some embodiments, the online system 140 determines the target audience as additional users having the threshold amount of interests matching interests associated with the page and other users having at least a threshold measure of similarity to the additional users having at least the threshold amount of interests matching the interests associated with the page.

In response to the one or more selection processes selecting the selected content item of the set of content items, the online system 140 communicates the selected content item of the set of content items to a client device 110 associated with the additional user for presentation to the additional user. The online system 140 subsequently reduces the budget for presenting the selected content items to users by an amount based on the bid amount determined 335 for the selected content item when the selected content item is selected by the one or more selection processes. In some embodiments, the online system 140 decreases the budget by the amount in response to receiving an indication that the additional user performed an action corresponding to the received objective. The amount by which the budget is decreased may be based on the bid amounts associated with other content items included in the one or more selection processes in various embodiments.

If the online system 140 determined a target audience for presentation of content items of the set of content items, as selected content items from the set of content items are presented to additional users, the online system 140 modifies the target audience in some embodiments. Based on characteristics of additional users presented with a content item of the set of content items, the online system 140 modifies the target audience to include other users having at least a threshold measure of similarity to the additional users presented with a selected content items of the set of content items who interacted with the selected content item of the set of content items or who performed an action corresponding to the received objective after being presented with the selected content item of the set of content items. Examples of determining measures of similarity between users who performed one or more specific interactions with the page and other users are further described in U.S. patent application Ser. No. 13/297,117, filed on Nov. 15, 2011, U.S. patent application Ser. No. 14/290,355, filed on May 29, 2014, and U.S. patent application Ser. No. 15/068,526, filed on Mar. 11, 2016, each of which is incorporated by reference in its entirety. Modifying the target audience based on actions performed by additional users who were presented with content items of the set of content items allows the online system 140 to increase likelihoods that content items of the set of content items are presented to additional users who are likely to perform the action corresponding to the received objective.

As selected content items of the set of content items are presented to additional users, the online system 140 determines one or more metrics describing performance of the selected content items. If the selected content items of the set are changed based on modification of content included on the page, the one or more metrics are correspondingly changed to evaluate performance of content items of the set selected based on the modification of the content included on the page. Example metrics describing performance of selected content items of the set include: a number of interactions corresponding to the received objective performed by additional users presented with a selected content item of the set, an amount of compensation provided by the user to the online system 140 for presentation of a selected content item of the set, a number of times a selected content item of the set has been presented to additional users, or any other suitable information describing performance of presentation of selected content items of the set. Hence, the online system 140 allows the user for whom the page is maintained 305 to evaluate effectiveness of presentation of the selected content items of the set to additional users, while accounting for modifications to the selected content items.

Figure 4:
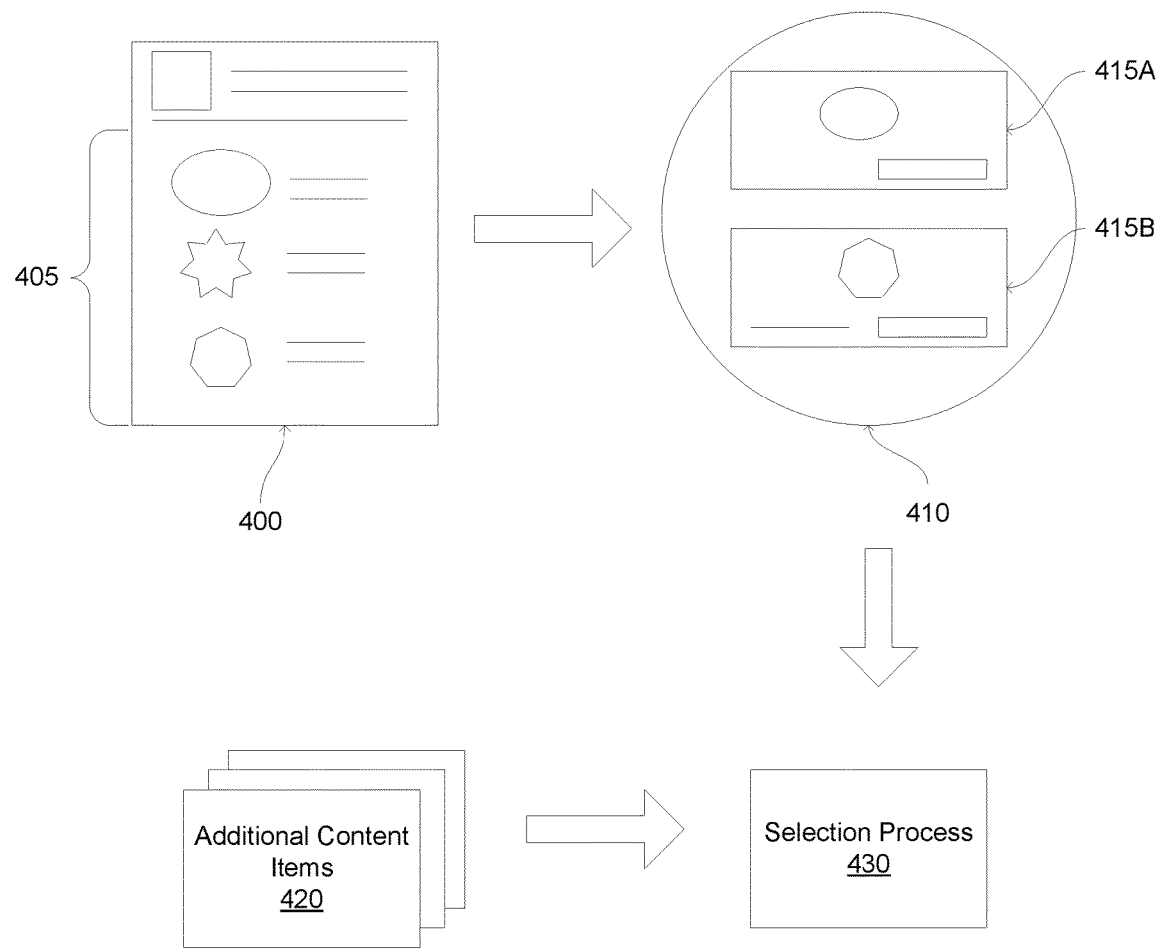
FIG. 4 is a process flow diagram of an online system generating content items for presentation to various users based on content provided to a page of content maintained by the online system, in accordance with an embodiment.

FIG. 4 is a process flow diagram of an online system 140 generating content items for presentation to various users based on content provided to a page of content maintained by the online system 140 for a user. As further described above in conjunction with FIG. 3, the online system 140 maintains a page 400 for a user that includes content 405 provided to the online system 140 by the user. As online system users access the page 400, the users view or interact with the content 405 included on the page 400. To increase a number of online system users who may interact with the page or with other content associated with the page, the online system 140 generates a set 410 of content items from the content 405 included on the page 400 based on an objective for presentation of content items received from the user for whom the page 400 is maintained. The objective specifies a desired action for additional users to perform when presented with content items associated with the page 400, and the online system 140 includes text, images, or other data in the generated content items based on the received objective. As further described above, the online system 140 may generate the set of content based on content 405 included on the page 400 with which users performed at least a threshold amount of a particular interaction or based on content 405 included on the page 400 that received at least a threshold amount of interaction from users. One or more content items 415A, 415B of the set 410 are subsequently selected. As described above in conjunction with FIG. 3, the online system 140 may present content items of the set 410 to the user for whom the page 400 is maintained and receive selections of the content items 415A, 415B from the user. Alternatively, the online system 140 may select the content items 415A, 415B from the set 410 without receiving input from the user. For example, the online system 140 applies one or more models to content items of the set 410, determines likelihoods of additional users interacting with various content items of the set 410, and selects content items 415A, 415B from the set 410 based on the determined likelihoods. If the user modifies content 405 included on the page 400, the online system 140 modifies the set 410 of content items accordingly; for example, if the user provides at least a threshold amount of additional content to the online system 140 for inclusion on the page 400, the online system 140 generates additional content items for the set 410 based on the additional content and may modify selection of content items 415A, 415B of the set 410, if necessary.

As further described above in conjunction with FIG. 3, when the online system identifies an opportunity to present content to an additional user, the online system 140 includes one or more of the selected content items 415A, 415B of the set 410 along with additional content items 420 in a selection process 430 that selects content for presentation to the additional user via the opportunity. In various embodiments, the selection process 430 determines expected values for the selected content items 415A, 415B and the additional content items 420 based on bid amounts for the selected content items 415A, 415B and for the additional content items 420 and selects content based on the expected values. As further described above in conjunction with FIG. 3, the online system 140 receives a budget from the user for whom the page 400 is maintained that specifies a total amount of compensation the user provides the online system 140 in exchange for presenting selected content items 415A, 415B of the set 410. Based on the budget and prior presentation of selected content items 415A, 415B of the set 410 to additional users, the online system 140 determines bid amounts for a selected content item 415A, 415B of the set 410 for the identified opportunity and includes the determined bid amount in the selection process 430 in association with the selected content items 415A, 415B. If the selection process 430 determines a selected content item 415A, 415B of the set 410 should be presented to the additional user, the online system 140 communicates the selected content item 415B, 415B of the set 410 to a client device 110 associated with the additional user for presentation.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

maintaining a page of content for a user at an online system, the page including content provided by the user to the online system;

receiving, from the user, an objective for presentation of one or more content items to additional users by the online system, the objective specifying a desired action by additional users presented with the one or more content items;

generating, by the online system, a set of content items from the content included on the page maintained for the user, each of the set of content items including content from the page maintained for the user and additional content determined by the online system from the received objective, wherein the additional content comprises a phrase or an image associated with the received objective;

selecting one or more of the content items of the set of content items without receiving input from the user;

receiving a budget for presentation of the selected one or more content items to the additional users, the budget specifying an amount of compensation provided by the user to the online system for presentation of the selected one or more content items to the additional users;

identifying an opportunity to present content to an additional user;

determining a bid amount for presentation of a selected content item to the additional user via the opportunity based on the budget and prior presentations of the selected one or more content items; and including the selected content item and the determined bid amount in one or more selection processes selecting content for presentation to the additional users.

2. The method of claim 1, wherein generating, by the online system, the set of content items based on the content included on the page maintained for the user comprises:

determining interactions with different content included on the page by users of the online system;

selecting a set of content included on the page based on the determined interactions; and generating the set of content items based on the selected set of content included on the page.

3. The method of claim 2, wherein selecting the set of content included on the page based on the determined interactions comprises:

ranking different content included on the page based on amounts of one or more types of interactions by users with the different content; and selecting a set of content included in the page having at least a threshold position in the ranking.

4. The method of claim 3, wherein the one or more types of interactions are interactions corresponding to the objective.

5. The method of claim 2, wherein selecting the set of content included on the page based on the determined interactions comprises:

selecting a set of content included in the page having at least a threshold number of one or more types of interactions corresponding to the objective by users.

6. The method of claim 1, further comprising:
   identifying interactions by users with the content included on the page maintained for the user;
   modifying the set of content items based on the identified interactions; and
   selecting one or more content items of the modified set of content items.

7. The method of claim 1, further comprising:
   receiving additional content from the user for inclusion on the page maintained for the user;
   modifying the set of content items based on the additional content; and
   selecting one or more content items of the modified set of content items.

8. The method of claim 7, wherein modifying the set of content items based on the additional content comprises:
   modifying the set of content items in response to receiving at least a threshold amount of additional content from the user.

9. The method of claim 1, wherein selecting one or more of the content items of the set of content items comprises:
   presenting the one or more content items to the user;
   receiving selections of one or more of the content items from the user.

10. The method of claim 1, wherein receiving the budget for presentation of the selected one or more content items to the additional users comprises:
    receiving the budget and one or more targeting criteria specifying characteristics of additional users eligible to be presented with the selected one or more content items.

11. The method of claim 1, wherein identifying the opportunity to present content to the additional user comprises:
    determining a target audience of additional users based on users who performed one or more specific interactions with the page maintained for the user; and
    identifying an opportunity to present content to an additional user of the target audience.

12. The method of claim 11, wherein the target audience further includes additional users having an interest specified in a corresponding user profile matching an interest associated with the page maintained for the user.

13. The method of claim 11, wherein determining the target audience of additional users based on users who performed one or more specific interactions with the page maintained for the user comprises:
    determining the target audience as additional users having at least a threshold measure of similarity to users who performed the one or more specific interactions with the page maintained for the user.

14. The method of claim 11, wherein identifying the opportunity to present content to the additional user further comprises:
    modifying the target audience to include users having at least a threshold measure of similarity to additional users presented with one or more of the selected content items who interacted with the presented one or more selected content items.

15. A computer program product comprising a non-transitory computer readable storage medium having instructions encoded thereon that, when executed by a processor, cause the processor to:
    maintain a page of content for a user at an online system, the page including content provided by the user to the online system;
    receive, from the user, an objective for presentation of one or more content items to additional users by the online system, the objective specifying a desired action by additional users presented with the one or more content items;
    generate, by the online system, a set of content items from the content included on the page maintained for the user, each of the set of content items including content from the page maintained for the user and additional content determined by the online system from the received objective, wherein the additional content comprises a phrase or an image associated with the received objective;
    select one or more of the content items of the set of content items without receiving input from the user;
    receive a budget for presentation of the selected one or more content items to the additional users, the budget specifying an amount of compensation provided by the user to the online system for presentation of the selected one or more content items to the additional users;
    identify an opportunity to present content to an additional user;
    determine a bid amount for presentation of a selected content item to the additional user via the opportunity based on the budget and prior presentations of the selected one or more content items; and
    include the selected content item and the determined bid amount in one or more selection processes selecting content for presentation to the additional users.

16. The computer program product of claim 15, wherein generate, by the online system, the set of content items based on the content included on the page maintained for the user comprises:
    determine interactions with different content included on the page by users of the online system;
    select a set of content included on the page based on the determined interactions; and
    generate the set of content items based on the selected set of content included on the page.

17. The computer program product of claim 16, wherein select the set of content included on the page based on the determined interactions comprises:
    rank different content included on the page based on amounts of one or more types of interactions by users with the different content; and
    select a set of content included in the page having at least a threshold position in the ranking.

18. The computer program product of claim 17, wherein the one or more types of interactions are interactions corresponding to the objective.

19. The computer program product of claim 15, wherein the non-transitory computer readable storage medium further has instructions encoded thereon that, when executed by the processor, cause the processor to:
    receive additional content from the user for inclusion on the page maintained for the user;
    modify the set of content items based on the additional content; and
    select one or more content items of the modified set of content items.

20. The computer program product of claim 19, wherein modify the set of content items based on the additional content comprises:
    modify the set of content items in response to receiving at least a threshold amount of additional content from the user.

21. The computer program product of claim 15, wherein identify the opportunity to present content to the additional user comprises:
- determine a target audience of additional users based on users who performed one or more specific interactions with the page maintained for the user; and
- identify an opportunity to present content to an additional user of the target audience.

22. The computer program product of claim 21, wherein the target audience further includes additional users having an interest specified in a corresponding user profile matching an interest associated with the page maintained for the user.

23. The computer program product of claim 21, wherein determine the target audience of additional users based on users who performed one or more specific interactions with the page maintained for the user comprises:
- determine the target audience as additional users having at least a threshold measure of similarity to users who performed the one or more specific interactions with the page maintained for the user.

* * * * *